(12) United States Patent
Hammer et al.

(10) Patent No.: US 6,384,153 B2
(45) Date of Patent: May 7, 2002

(54) PROCESS OPTIMIZATION OF PEROXIDE INJECTION DURING POLYETHYLENE PRODUCTION

(75) Inventors: Klaus Hammer, Mutterstadt; Georg Groos, Dannstadt-Schauernheim; Michael Stenger, München; Wilhelm Weber, Neustadt; Andreas Deckers, Flomborn, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/891,318

(22) Filed: Jun. 27, 2001

(30) Foreign Application Priority Data

Jun. 27, 2000 (DE) .......................................... 100 30 306

(51) Int. Cl.$^7$ .................................................. C08F 2/04
(52) U.S. Cl. .............................. 526/64; 526/66; 526/73; 526/227; 526/352; 526/352.2
(58) Field of Search .............................. 526/64, 66, 73, 526/227, 352, 352.2

(56) References Cited

U.S. PATENT DOCUMENTS 4,008,049 A * 2/1977 Clemmer et al. .............. 23/288

FOREIGN PATENT DOCUMENTS

| DE | 199 12 855 | 9/2000 |
|---|---|---|
| EP | 0 449 092 | 10/1991 |
| EP | 0 567 818 | 11/1993 |

OTHER PUBLICATIONS

H. Boensel, et al., Chem.–Ing.–Tech., vol. 67, No. 7, pp. 862–864, "Sicherheitstechnische Untersuchungen Des Explosiven Zerfalls Von Verdichtetem Ethen", 1995.

* cited by examiner

*Primary Examiner*—David W. Wu
*Assistant Examiner*—William K Cheung
(74) *Attorney, Agent, or Firm*—Oblon, Spivak, McClelland, Maier & Neustadt, P.C.

(57) ABSTRACT

In a process for the high-pressure polymerization of ethylene in a high-pressure autoclave or in a high-pressure tube reactor having one or more metering points for one or more peroxides, no peroxide or a reduced amount of peroxide is metered in during the time interval in which the pressure is lowered by opening a pressure maintenance valve and the original amount of peroxide per unit time is metered in again as soon as the pressure after closure of the pressure maintenance valve has built up again so that it exceeds 90% of the pressure difference between nominal pressure and lowered pressure.

7 Claims, 2 Drawing Sheets

PROCESS OPTIMIZATION OF PEROXIDE INJECTION DURING POLYETHYLENE PRODUCTION

The present invention relates to a process for preparing polyethylene, in particular low density polyethylene (LDPE), in which multiple injection of peroxide takes place. Specifically, the present invention relates to a process for the high-pressure polymerization of ethylene in a high-pressure autoclave or in a high-pressure tube reactor having one or more metering points for one or more peroxides, wherein no peroxide or a reduced amount of peroxide is metered in during the time interval in which the pressure is lowered by opening a pressure maintenance valve and the original amount of peroxide per unit time is metered in again as soon as the pressure after closure of the pressure maintenance valve has built up again so that it exceeds 90% of the pressure difference between nominal pressure and lowered pressure.

The synthesis of polyethylene, for example LDPE, is carried out industrially either in continuous stirring autoclaves or in tube reactors. In both cases, the process employs different pressure stages. A low-pressure compressor compresses the fresh gas (ethene) provided with catalyst to from 150 to 300 bar. It is mixed there with the unreacted circulating gas of the high-pressure circuit and brought by means of the high-pressure compressor to operating pressure (generally from 1,400 to 3,500 bar at from 130 to 270° C.). Both the tube reactor and the stirring autoclave can be operated with multiple injection of initiator (peroxide or oxygen). This allows control of the reaction and correspondingly better heat removal.

Peroxidic initiators used are, for example: didecanoyl peroxide, 2,5-dimethyl-2,5-di(2-ethylhexanoylperoxy) hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbo)cyclohexane as an isomer mixture, tert-butyl perisononanoate, 1,1-di(tert-butylperoxy)-3,3,5-trimethylcyclohexane, 1,1-di(tert-butylperoxy)cyclohexane, methyl isobutyl ketone peroxide, tert-butyl peroxyisopropylcarbonate, 2,2-di-tert-butylperoxy)butane or tert-butylperoxyacetate, also tert-butyl peroxybenzoate, di-tert-amyl peroxide, dicumyl peroxide, the isomeric di(tert-butylperoxyisopropyl) benzenes, 2,5-dimethyl-2,5-di-tert-butylperoxyhexane, tert-butylcumyl peroxide, 2,5-dimethyl-2,5-di(tert-butylperoxy) hex-3-yne, di-tert-butyl peroxide, 1,3-diisopropyl monohydroperoxide, cumene hydroperoxide or tert-butyl hydroperoxide.

In the case of a tube reactor, heat removal is greatly inhibited by a laminar boundary layer having a high polymer content at the wall. This is removed, for example, by briefly opening the pressure maintenance valve at the reactor outlet further at intervals of from 10 seconds to a few hours and/or varying the hot water temperature; the boundary layer is then detached and carried out by the turbulence of the outflowing gas. To handle ethene safely, it has to be remembered that ethene decomposes with explosion-like rapidity under certain temperature and pressure conditions to form carbon, methane and hydrogen. This undesirable reaction can occur particularly in the case of the high-pressure polymerization of ethene. The drastic pressure and temperature increase which follows such an event represents a considerable hazard potential for the operational safety of the production plant. Even when the pressure relief devices are actuated in good time, the decomposition leads, owing to carbon formation, to considerable production disruption and additional costs for cleaning the plant and restoring it to an operational state. Furthermore, the emission of particulate carbon leads to pollution of the environment.

The reaction conditions under which decomposition of ethene is to be expected may be found in the literature (see, for example, Chem.-Ing.-Tech. 67 (1995), pages 862 to 864).

It is an object of the invention to provide a process for preparing ethylene polymers in a tube reactor or autoclaves which, by avoiding or removing relatively severe deposits, ensures good heat transport and also drastically reduces the risk of spontaneous decomposition of ethene. It is a further object of the invention to increase the conversion by increasing the amount of peroxide metered in per unit time and unit weight of starting material.

According to the present invention, the solution to these objects starts out from a process for the high-pressure polymerization of ethene in a tube reactor with multiple injection of peroxide at various peroxide addition points along the main flow direction of ethene. This amount of peroxide metered in per unit time will hereinafter also be referred to as the original amount. The reaction pressure is temporarily lowered (pressure reduction) at approximately constant time intervals. In the process of the present invention, the amount of peroxide introduced per unit time into the tube reactor at the respective peroxide addition point is reduced during the time interval between the point in time at which the temporary pressure decrease produced by a pressure-reduction procedure goes through a pressure minimum and the point in time at which a pressure corresponding to the pressure minimum of the respective pressure-reduction procedure plus 90% of the pressure drop amplitude of the respective pressure-reduction procedure is reached. This is achieved according to the present invention by metering in no peroxide or a reduced amount of peroxide during the time interval in which the pressure is lowered by opening a pressure maintenance valve and once again metering in the original amount of peroxide per unit time as soon as the pressure after closure of the pressure maintenance valve has built up again so that it exceeds 90% of the pressure difference between nominal pressure and lowered pressure. The amount of peroxide metered in during the pressure-reduction procedure is preferably reduced by at least 15% of the original amount. The amount of peroxide metered in during the pressure-reduction procedure is particularly preferably reduced by from 15 to 90%. The amount of peroxide metered in during the pressure-reduction procedure is very particularly preferably reduced by from 30 to 40% or by from 45 to 55% or by from 60 to 70% or by from 70 to 80%. Here, the percentages are in each case by weight.

Some of the terms used in the achievement of the object of the invention will be explained below.

In the known processes, the reaction pressure is lowered temporarily at approximately constant time intervals. This is done by temporarily opening the pressure maintenance valve, as a result of which the pressure firstly drops and then, after reactivation of the pressure control circuit, approaches the set value again. Such a pressure transient has a relative pressure minimum in the plot of pressure versus time. The pressure drop until the relative pressure minimum is reached is relatively steep, while the pressure rise after going through the relative pressure minimum is firstly steep then increasingly flat. For the purposes of the invention, the time interval between the point in time at which the temporary pressure decrease produced by a pressure-reduction procedure goes through a pressure minimum and the point in time at which a pressure corresponding to the relative pressure minimum of the respective pressure-reduction procedure plus 90% of the pressure drop amplitude of the respective pressure-reduction procedure is reached is of particular importance. For the purposes of the present invention, pressure drop amplitude is the difference between the set value of the pressure control circuit and the relative pressure minimum of the temporary pressure decrease produced by a pressure-reduction procedure, i.e. the pressure transient.

It goes without saying that the pressure is not only a function of time but also a function of the reactor coordinates. All statements made with regard to pressure in the process of the present invention therefore relate to the pressure prevailing in the reactor tube at the level of the respective peroxide addition point.

For the purposes of the present invention, a peroxide addition point is the reactor coordinates at which peroxide is introduced into the reactor (in the course of multiple injection of peroxide). This applies individually to each peroxide addition point. Since the pressure is also a function of the reactor coordinates, the lowering of the amount of peroxide metered in per unit time generally has to be calculated and controlled individually for each peroxide addition point.

The percentage decrease in the amount of peroxide metered in per unit time is based on the amount of peroxide per unit time metered into the reactor at the respective peroxide addition point during all other operating phases, in particular when no pressure-reduction procedure is being carried out.

It has been observed that the pressure rise to the set value following the pressure decrease in conventional processes and the associated slowing of mass flow strongly favor the decomposition of ethene. It has also been observed that local decomposition processes generally occur from 5 to 6 seconds after the pressure minimum occurring as a result of pressure reduction.

According to the present invention, during the critical time period during which the pressure rises to the set value
   the polymerization in the vicinity of the addition point is retarded and
   the local peroxide concentration which has been increased as a result of the decreased mass flow and the likewise decreased convection is decreased
by lowering the amount of peroxide introduced per unit time into the respective peroxide addition point, preferably by at least 15% of the amount of peroxide metered in per unit time during other phases of operation.

This measure increases reactor safety without having to omit the pressure-reduction procedure. Alternatively, the amount of peroxide per amount of ethene and thus indirectly the conversion could be increased in this way while retaining the same level of reactor safety.

In a preferred embodiment of the process of the present invention, the amount of peroxide introduced is decreased by at least 15%, particularly preferably by from 15 to 90%, very particularly preferably by from 30 to 40% or by from 45 to 55% or by from 60 to 70% or by from 70 to 80%.

The polyethylenes obtainable by means of the process of the present invention have a density of from 0.900 to 0.955 g/cm$^3$, preferably from 0.910 to 0.945 g/cm$^3$ and particularly preferably from 0.915 to 0.940 g/cm$^3$, measured at 23° C. Polyethylene waxes having a molecular weight $M_n$ of not more than 20,000 g, preferably not more than 10,000 g and particularly preferably not more than 7,500 g, can be readily prepared by the process of the present invention. The molecular weight distribution is in the range from 2 to 10. The melting points are in the range from 60 to 125° C., preferably from 80 to 120° C. However, the process of the present invention is also well suited to the preparation of relatively high molecular weight LDPE having a molecular weight $M_n$ of more than 20,000 g, preferably more than 80,000 g and particularly preferably more than 120,000 g. The molecular weight distribution of the relatively high molecular weight LDPE prepared by the process of the present invention is in the range from 2 to 20.

BRIEF DESCRIPTION OF DRAWINGS

The process of the present invention will now be illustrated with the aid of the drawing below. In the drawing, FIG. 1 schematically shows an apparatus for carrying out the process of the present invention.

FIG. 2 shows a temporary pressure decrease, namely a pressure transient, resulting from a pressure-reduction procedure. The pressure-reduction procedure is commenced at the time $t_1$ by opening the pressure maintenance valve. The relative pressure minimum is reached at the time $t_2$ immediately before reactivation of the pressure control circuit and the associated at least partial closure of the pressure maintenance valve. The time interval between passage through the relative pressure minimum at the time $t_2$ and the time $t_3$ at which a pressure corresponding to the pressure minimum plus 90% of the pressure drop amplitude of the respective pressure-reduction procedure (ΔP) is reached is denoted by Δt. During this time interval, the amount of peroxide fed in per unit time $$\left(\frac{dn}{dt}\right)$$

Figure 1:
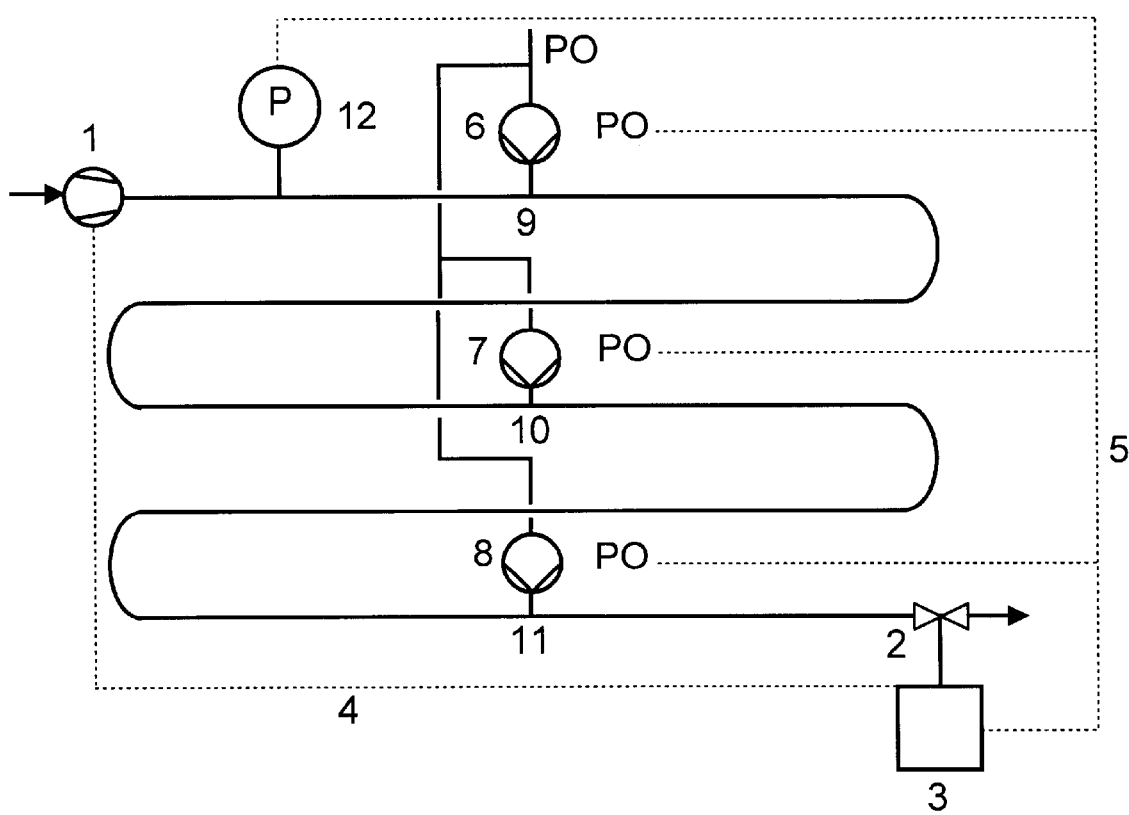
In FIG. 1, 1 denotes a high-pressure gas compressor which compresses ethene, with or without addition of oxygen, to the operating pressure. Here, the compressor 1 together with the pressure maintenance valve 2 form a control circuit 4 which is controlled by a control computer 3. Along the tube reactor, i.e. along the main flow direction of ethene, there are provided various peroxide addition points 9, 10, 11 at which metering pumps 6, 7, 8 feed peroxide into the tube reactor. The metering pumps 6, 7, 8 together with the pressure maintenance value 2 form a control circuit 5 which is likewise controlled from a control computer 3. In addition, the control computer 3 is connected to the pressure meter 12 which allows measurement of the pressure as a function of time. The local pressure at the peroxide addition points 9, 10, 11 is calculated by mathematical modeling of the pressure as a function of time and taking into account the material properties of the polymer (density, viscosity) and the amount of peroxide to be fed in as a function of time is determined therefrom.
Figure 2:
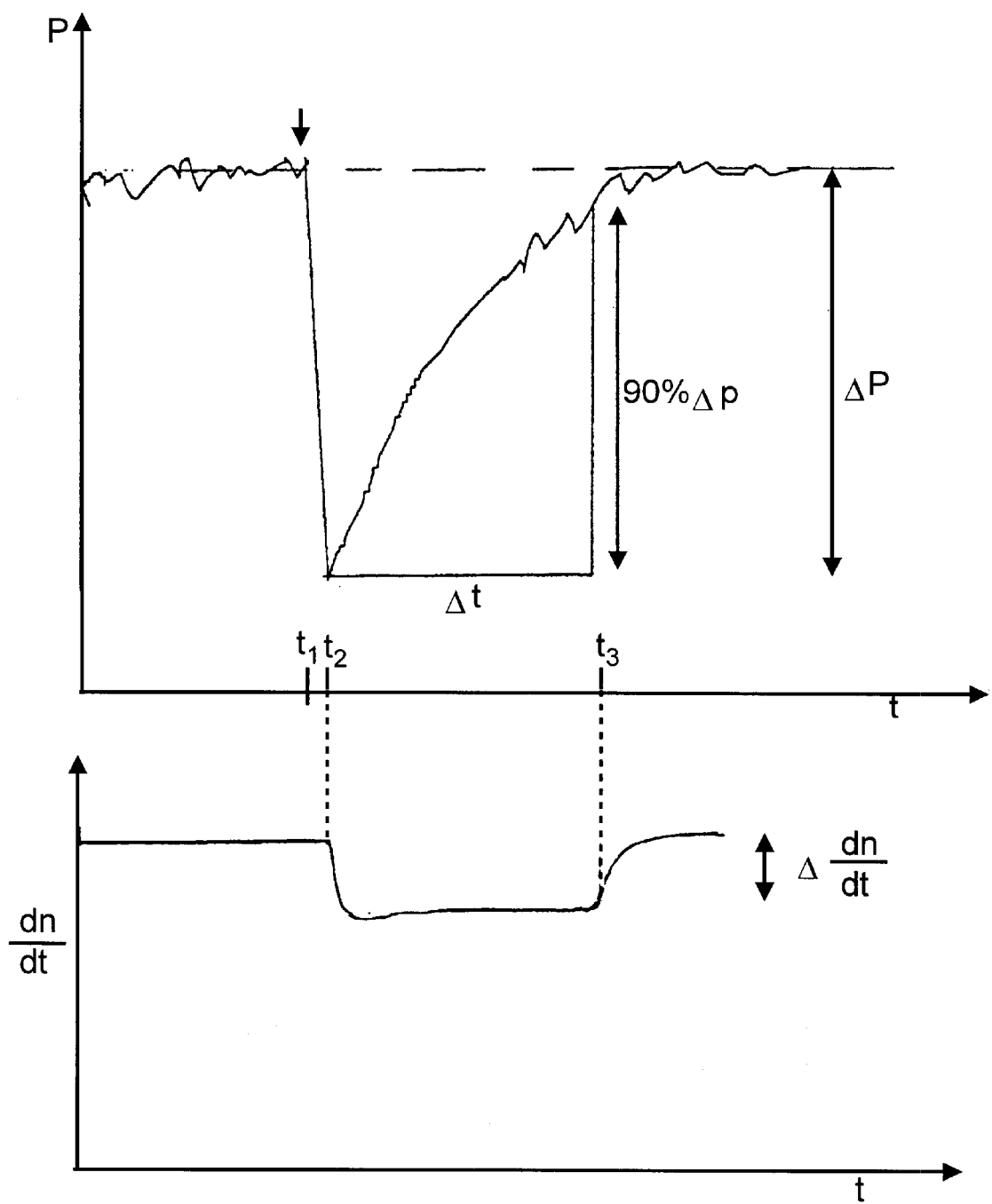
FIG. 2 shows the relationship between reactor pressure (P) and amount of peroxide (n) fed in per unit time (t), in each case as a function of time (t).

is reduced by at least 15%.

We claim:

1. A process for the high-pressure polymerization of ethylene in a high-pressure autoclave or in a high-pressure tube reactor having one or more metering points for one or more peroxides, wherein no peroxide or a reduced amount of peroxide is metered in during the time interval in which the pressure is lowered by opening a pressure maintenance valve and the original amount of peroxide per unit time is metered in again as soon as the pressure after closure of the pressure maintenance valve has built up again so that it exceeds 90% of the pressure difference between nominal pressure and lowered pressure.

2. A process as claimed in claim 1, wherein the amount of peroxide metered in during the pressure-reduction procedure is reduced by at least 15% of the original amount.

3. A process as claimed in claim 1, wherein the amount of peroxide metered in during the pressure-reduction procedure is reduced by from 15 to 90% of the original amount.

4. A process as claimed in claim 1, wherein the amount of peroxide metered in during the pressure-reduction procedure is reduced by from 30 to 40% of the original amount.

5. A process as claimed in claim 1, wherein the amount of peroxide metered in during the pressure-reduction procedure is reduced by from 45 to 55% of the original amount.

6. A process as claimed in claim 1, wherein the amount of peroxide metered in during the pressure-reduction procedure is reduced by from 60 to 70% of the original amount.

7. A process as claimed in claim 1, wherein the amount of peroxide metered in during the pressure-reduction procedure is reduced by from 70 to 80% of the original amount.

* * * * *